United States Patent [19]

Siverling et al.

[11] 4,363,057
[45] Dec. 7, 1982

[54] RECIRCULATING FILTER DUCT DESIGN

[75] Inventors: Michael M. Siverling; Stephen E. Wheeler, both of Rochester, Minn.

[73] Assignee: International Business Machines Corporation, Armonk, N.Y.

[21] Appl. No.: 239,810

[22] Filed: Mar. 2, 1981

Related U.S. Application Data

[63] Continuation-in-part of Ser. No. 57,631, Jul. 16, 1979, abandoned.

[51] Int. Cl.³ .................... G11B 23/02; G11B 25/04
[52] U.S. Cl. ................................. 360/98; 360/133
[58] Field of Search ............................. 360/97–99, 360/133; 206/444, 309

[56] References Cited

U.S. PATENT DOCUMENTS

| | | | |
|---|---|---|---|
| 3,812,534 | 5/1974 | Rosseau et al. | 360/98 |
| 3,825,951 | 7/1974 | Katsumori et al. | 360/133 |
| 3,973,273 | 8/1976 | Lissner et al. | 360/98 |
| 4,008,492 | 2/1977 | Elsing | 360/98 |
| 4,130,845 | 12/1978 | Kulma | 360/98 |

Primary Examiner—Alfred H. Eddleman
Attorney, Agent, or Firm—Robert W. Lahtinen

[57] ABSTRACT

A disk file is equipped with a recirculating filter duct utilizing the pressure differentials within an enclosure imparted by the rotating disk to induce an air flow in the duct having an inlet near the disk periphery and an outlet effectively radially inward thereof. The flow of air through this duct is enhanced by a deflector adjacent the duct outlet at the side thereof initially approached by a given point on the rotating disk and a projection approaching the opposite surface of the disk or disk pack and generally axially aligned with the deflector to equalize the forces exerted and avoid instability of disk operation. The duct is configured to eliminate eddy currents and the air volume within the enclosure is limited to increase the rate at which air changes occur.

12 Claims, 12 Drawing Figures

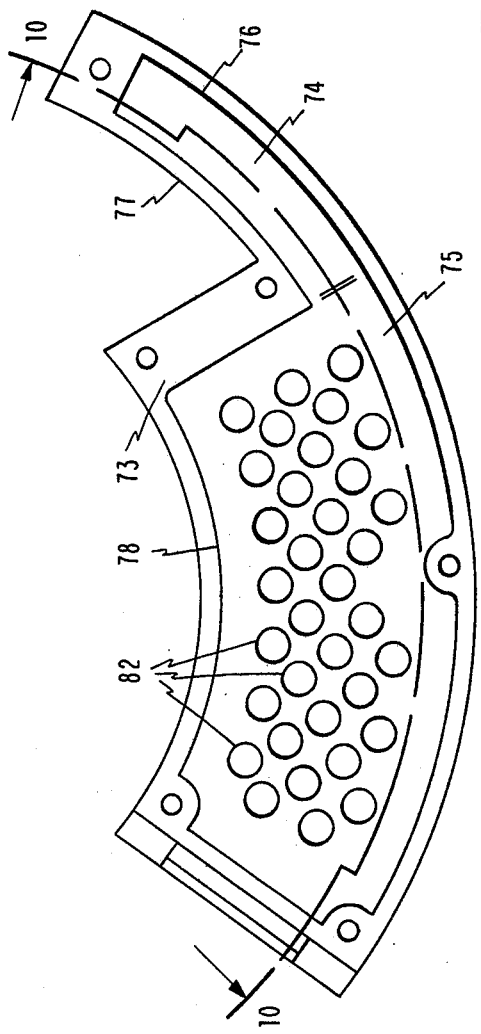
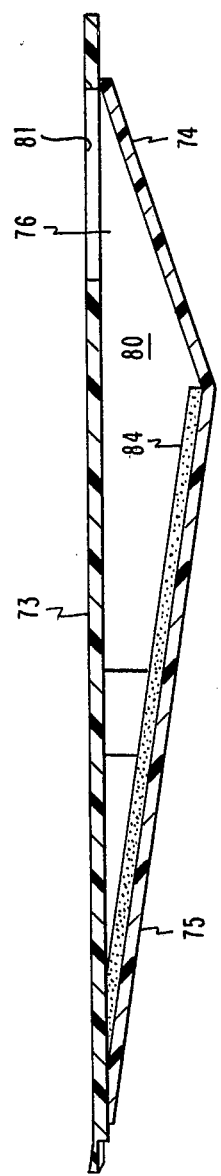

RECIRCULATING FILTER DUCT DESIGN

DESCRIPTION

BACKGROUND OF THE INVENTION

This is a continuation in part of application Ser. No. 57,631 filed July 16, 1979, now abandoned.

This invention relates to portable disk files and more particularly to a compact disk storage file including a novel recirculating filter duct design.

The proper functioning of a disk file, in addition to the structural integrity and uninterrupted continuity of the storage medium, requires that no outside intervention interfere with the device operation. Since the read/write transducers operate using an air bearing clearance with respect to the disk surface of 10 to 15 micro inches it is imperative that no airborn particles have a dimension equivalent to or exceeding such clearance.

The recognized need for atmospheric control within the disk enclosure has led to varying solutions, many of which result in a structure wherein more space is devoted to the filtering and air moving mechanism than to the data storage, transducing and electronic support portions. The enlarged volume within such a device creates more opportunity for airborn particles to be present and often reduces the number of air changes per unit time and thereby limits the effectiveness of particle separation.

In the drive incorporating the present invention, a base casting and cover cooperate to form a sealed enclosure that surrounds the motor in addition to the disk media, transducers and supporting electronics. The base and cover present shrouding surfaces that closely confront each axial side of the multi disk media to limit the volume of air within that surrounds the operative portions of the device. In the illustrated embodiment these shrouding surfaces are separated from the disk surface by a distance less than one-third the axial space between adjoining disks within the disk pack. The reduced volume causes a given level of filtered air to effect a greater number of air changes per unit time. A duct containing a filter is formed with inlet and outlet openings through a shroud surface and confronting the disk surface. Air flow is induced through the duct to produce a supply of filtered air at the duct outlet by the rotating disk surface with the effective central point of the duct inlet opening being a greater distance from the center of rotation of the disk element than the effective center of area of the duct outlet opening. The rotating disk thereby induces a higher pressure condition at the duct inlet opening and a reduced pressure at the duct outlet opening. A supplemental aspirating effect is applied to air at the duct outlet by an "air foil like" deflector that is inclined from the shroud surface toward the disk surface to increase the velocity of air passing the duct outlet and cause entrainment of air leaving the duct. To prevent interference with air flow through the duct caused by turbulent flow, the duct width between the inlet and filter is configured to initially slowly increase and thereafter rapidly increase as the filter is approached. This prevents the circular whirlpool or eddy current motion that would impede flow. To equalize the involved forces and render more effective the air flow induced in the filter duct, a barrier ridge is formed on the shroud wall surface at the opposite axial end of the pack of disk elements that is axially aligned with the ridge of the deflector that adjoins the duct outlet.

It is an object of this invention to provide a sealed, minimum volume disk pack enclosure using the air aspirating properties of the rotating disk elements to induce air flow through a filter duct. It is a further object of the invention to limit the enclosed volume to enhance the air aspirating of the rotating disk media and increase the frequency of air changes. It is also an object of this invention to provide a duct configuration to exclude eddy currents in air flowing through such filter duct. It is also an object of the invention to avoid propagation of turbulent air currents near the disk surface that would adversely affect the flying characteristics of the magnetic transducers. The foregoing and other objects, features and advantages of the invention will be apparent from the following more particular description of a preferred embodiment of the invention, as illustrated in the accompanying drawings.

BRIEF DESCRIPTION OF THE DRAWING

FIG. 9 is a bottom view of a cover plate, inlet chamber and filter assembly of a second embodiment of the invention.

FIG. 10 is a section view as seen along line 10—10 of FIG. 9.

DISCLOSURE OF THE INVENTION

Figure 1:
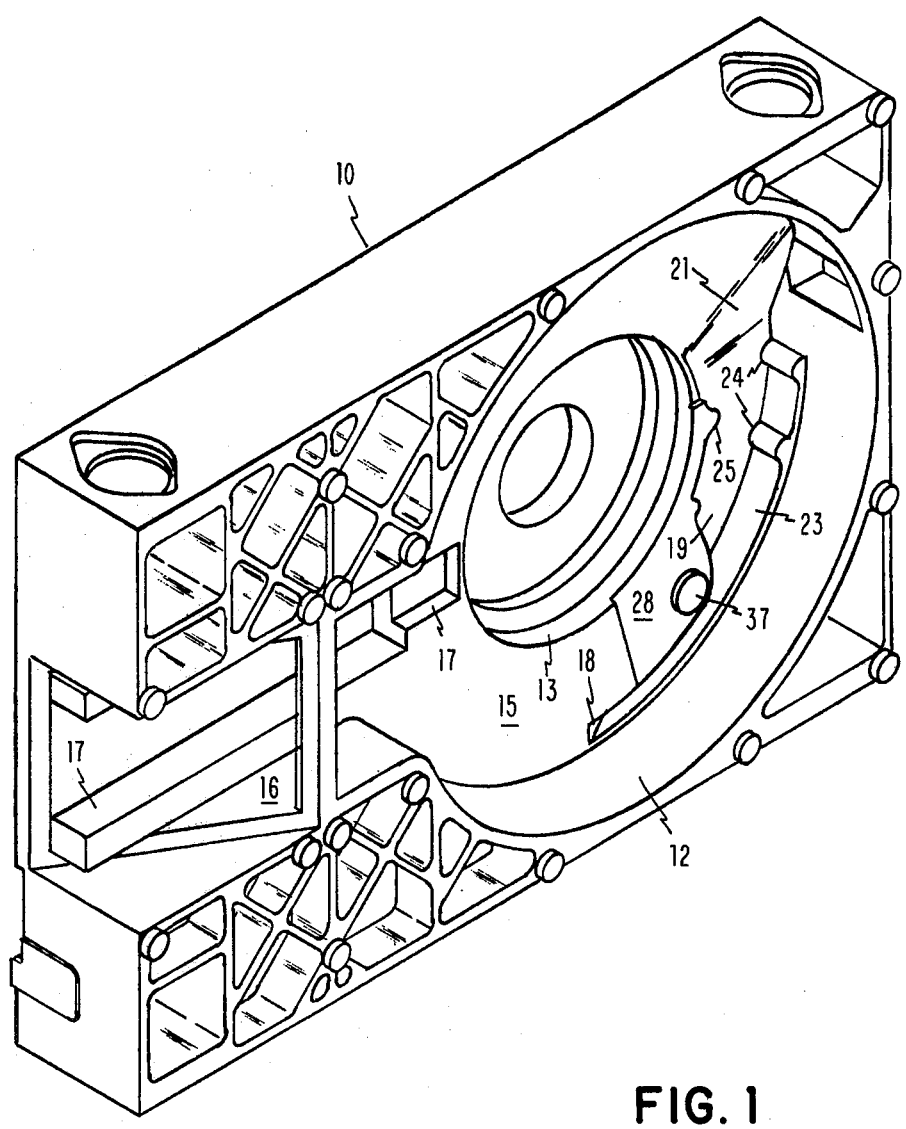
FIG. 1 is an isometric view of a disk memory base member showing the filter duct of the present invention formed as an integral part thereof.
Figure 2:
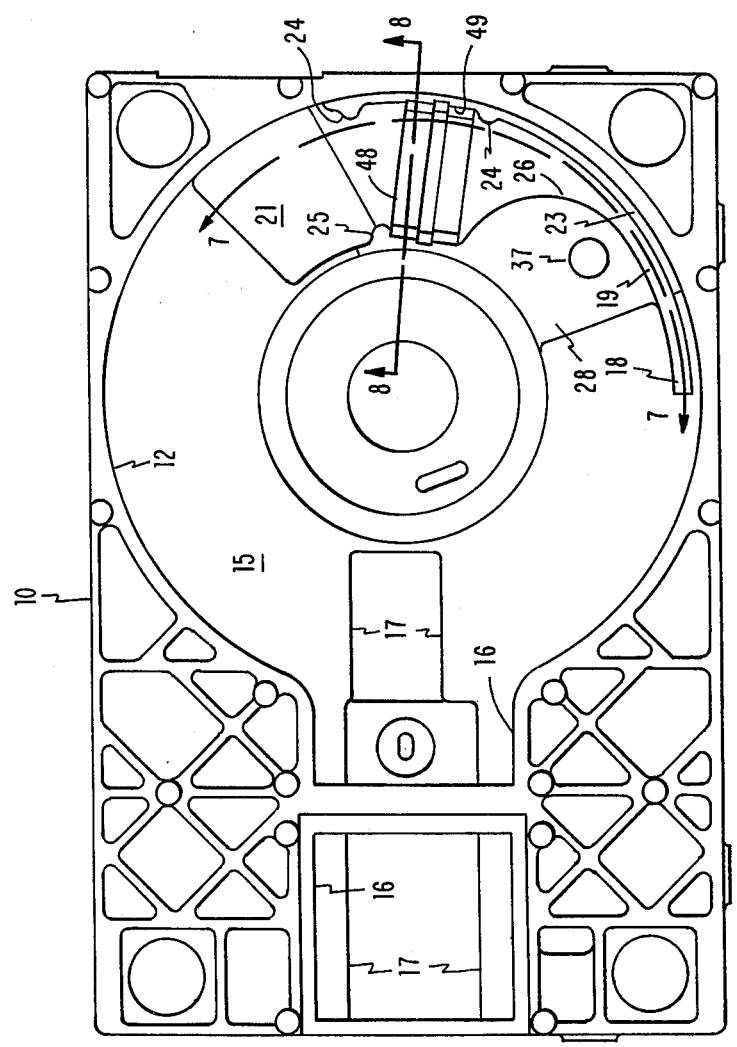
FIG. 2 is an elevation of the disk memory base member of FIG. 1.

FIGS. 1 and 2 show a base member 10 for a magnetic disk memory which includes a cylindrical wall surface portion 12 that surrounds the disks and a further cylindrical recess defined by wall surface 13 in which a concentric drive motor is received. The planar surface 15 confronts and shrouds the magnetic disk memory surface at one axial side. A cylindrical surface defined by wall 12 is interrupted between wall surfaces 16. This opening and the recesses in surface 15 defined by wall portions 17 provide space for mounting the disk memory transducers and permitting such transducers to access the disk surfaces. The transducers and the mounting structures therefore are not shown since they form no part of the present invention.

A duct extending in a generally circular path about the disk axis of rotation is formed as a depression in the shroud surface 15. The duct that has an initial inclined surface 18 extending from shroud surface 15 to the duct floor 19 and a terminal incline surface 21 extending from duct floor surface 19 to shroud surface 15. The duct outer radial elevation surface 23 follows a generally circular path with a pair of projections 24 provided for mounting purposes. The radially inward duct sidewall 26 initially proceeds from the incline surface 18 in substantial parallelism to the outer wall 23 and thereafter rapidly diverges from the outer wall 23 to a terminal portion generally equidistant from the axis of rotation of a disk or disk pack received in the circular recess defined by the surface 12. A recessed surface 28 has a depth equal to the thickness of a cover member 30 that defines the upper wall surface of the duct and provides an upper surface 31 that is coplanar with and a continuation of the shroud surface 15.

Figure 3:
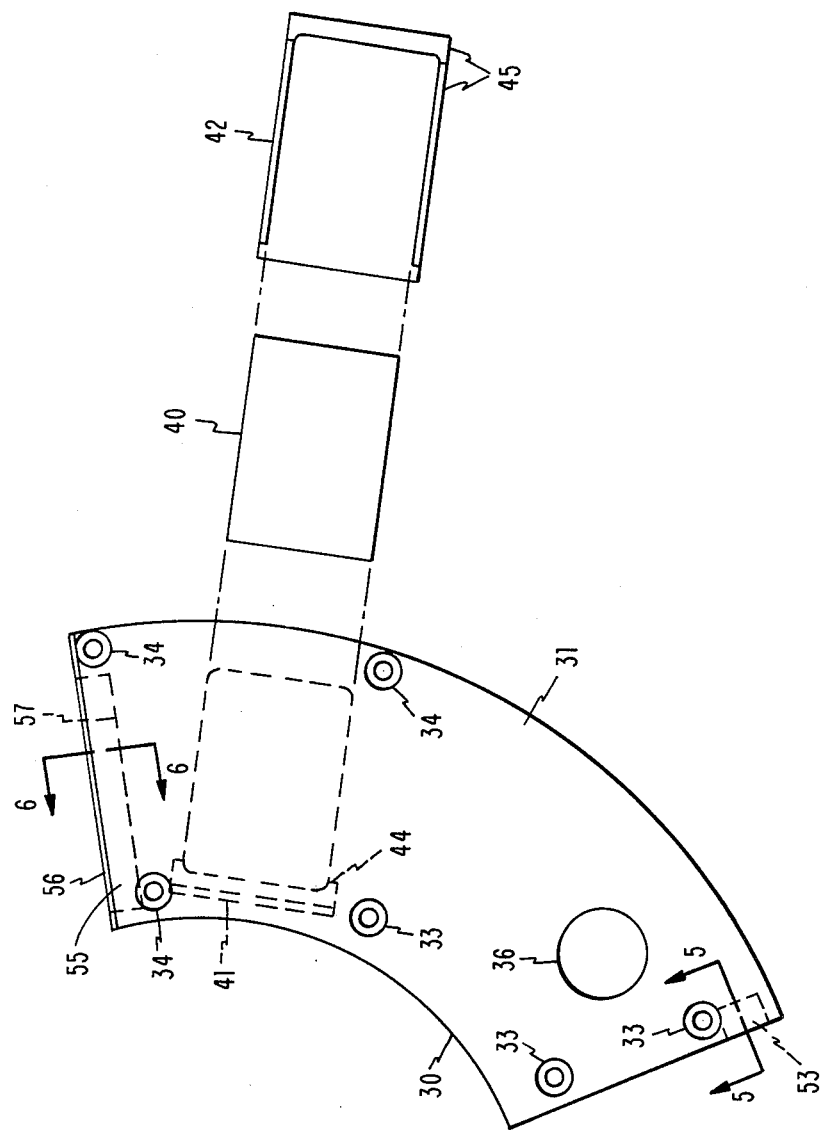
FIG. 3 shows an exploded view of the cover and filter element that cooperates with the base member of FIGS. 1 and 2 to enclose the filter duct.
Figure 5:
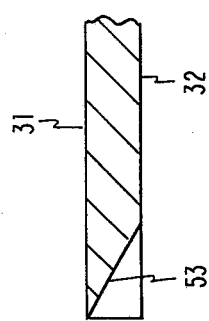
FIG. 5 is a section view taken along line 5—5 of FIG. 3.
Figure 4:
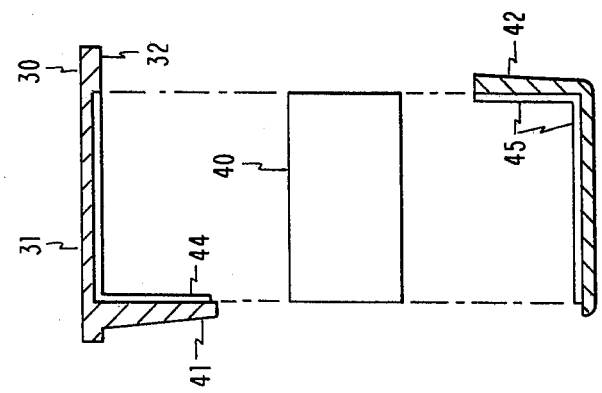
FIG. 4 is an exploded section view of the cover and filter element of FIG. 3 as seen in a section through the center of the filter by a plane normal to the major surface of the cover.

The duct cover 30 shown in FIGS. 3 and 4 is installed with the lower surface 32 abutting the base member recess surface 28 and is secured in position by six fasteners that are received in six openings 33 and 34. The fasteners extending through openings 33 are secured in the base surface 29 while the fasteners extending through openings 34 are received in the upper surfaces of embossments 24 and 25. The circular opening 36 in cover 30 is received about boss 37. The upper surface of boss 37 is coplanar with the shroud surface 15.

The filter element 40 is retained by a lower surface of cover 30, a flange 41 depending from and forming a part of the cover, and a retainer 42. The retainer 42 and cover 30 are bonded together with the filter positively retained by the marginal flanges 44 and 45 of cover 30 and retainer 42 respectively.

The downwardly depending filter enclosure including cover 30 with flange 41 and retainer 42 extending from the duct cover is received in the recessed portions 47, 48 and 49 found respectively in duct wall surfaces 26, 19 and 23. A length of gasket material 80 seals the depending filter enclosure within the duct and such gasket material is disposed in a continuous recess 50 found in the 3 recessed wall portions 47, 48 and 49.

Figure 6:
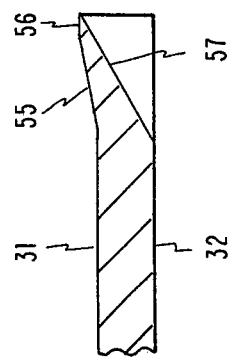
FIG. 6 is a section view taken along line 6—6 of FIG. 3.

As seen in section 5—5 of FIG. 3 an inclined surface 53 is formed in the cover 30 which becomes a part of the duct inlet and aids in deflecting air into the duct inlet. The section 6—6 of FIG. 3 as shown in FIG. 6 illustrates the cover structure overlying the duct outlet. The surface 55 rises from the planar top surface 31 of the duct to the surface 56 which confronts the disk 60 in the assembled condition. The inclined lower surface 57 becomes a part of the duct outlet which extends to the plane of the shroud surface 15.

Figure 7:
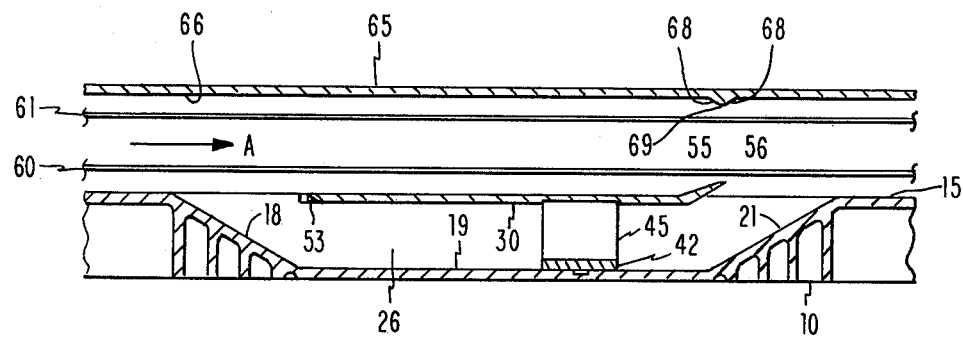
FIG. 7 is a section view of the base member taken along line 7—7 of FIG. 2 with the disks, duct cover, and file cover assembled thereto and shown in section.

FIG. 7 illustrates the circular section 7—7 of the base member of FIG. 2 with the duct cover 30, disks 60, 61 and disk file cover 65 assembled thereto. The shroud surfaces 15 and 66 presented by base member 10 and disk file cover 65 respectively are equidistant from the confronting disk surface and closely confining to minimize the enclosed air space. The spacing between the two disk elements 60 and 61 is slightly in excess of three times the spacing between the shroud surfaces 15 and 66 and the confronting surfaces of disks 60, 61. The inclined surface 55 terminates in the surface 56 confronting the disk 60 above the duct outlet and reduces the spacing between the planes of shroud surface 15 and disk 60 by about one-half above the surface 56. The disk file cover 65 includes a barrier that is formed by inclined surfaces 68 extending from shroud surface 66 which terminate in a surface 69. The barrier reduces the clearance between shroud surface 66 and the surface of disk 61 by about one-third.

Figure 8:
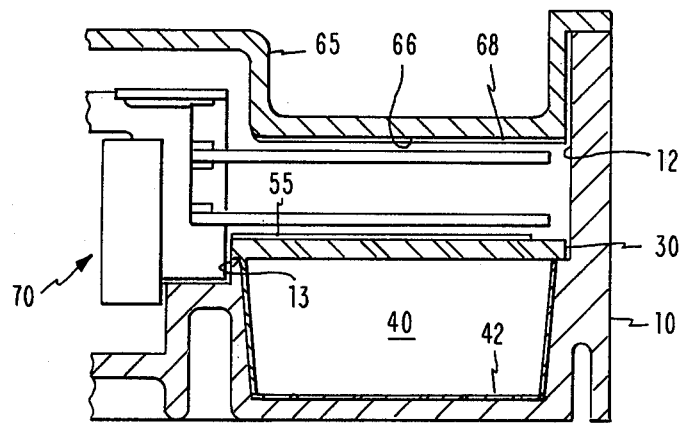
FIG. 8 is a section view of the file memory base member taken along lines 8—8 of FIG. 2 with the disks, motor, duct cover and file cover assembled thereto and shown in section.

FIG. 8 is a partial radial section of the base element 10 taken along line 8—8 of FIG. 2 with the duct cover 30, filter 40, disks 60, 67, motor 70 and cover 65, some of which are in section, assembled thereto.

With the enclosure formed by the base member 10 and cover 65 surrounding the disks 60, 61 in the assembled condition, the disks are rotated in the direction of arrow A in FIG. 7 or in a counterclockwise direction with respect to the base member as viewed in FIGS. 1 and 2. The rotating disks, although presenting a very smooth highly finished surface impart a force to the enclosed ambient air which causes a pressure gradient which increases as the distance from the center of disk rotation increases and also induces a tangential motion of the air at any given point along the disk surface.

The duct is basically a tubular structure having a varying rectangular cross section. The inlet opening overlying the inclined surface 18 has an area center substantially further from the axis of rotation of the confronting disk than the area center of the duct outlet opening overlying the inclined surface 21. Accordingly, the air pressure at the duct inlet is greater than the air pressure at the duct outlet during disk rotation, caused by the natural centrifugal pumping action, which induces an air flow through the duct and the filter disposed therein.

In addition the air flow induced by the pressure differential between duct inlet and duct outlet, positive aspiration is provided to increase the air flow through the duct. The inclined surface 55 and the surface 56 confronting disk 60 function in the manner of an air foil to produce a venturi effect. As the clearance is reduced to that between disk 60 and surface 56 from the larger clearance between shroud surface 15 and disk 60, the speed increases and air is drawn from the duct and exhausted into the free air stream between the disk and shroud surface. A projection is formed on the supper shroud surface 66 with the inclined surfaces 68 terminating in a surface 69 which confronts the disk 61 and is axially aligned with the surface 56. This projection serves to equalize the pressure condition at each axial side of the disk pack. This is provided to introduce additional restriction to enhance aspiration and to avoid eratic disk rotation that might result from localized pressure variations occurring at one side of the disk pack.

The combination of duct air flow inducing factors afforded by the pressure differential and the aspirating effect of the venturi type structure make the filtering action more effective. The closely confining shroud surfaces adjoining the disks not only increase the effectiveness of both the centrifugal pumping action and the aspiration of the venturi type structure, but reduction in enclosed volume causes the air flow through the filter to more frequently be the equivalent of a complete air change. The greater the number of air changes that occur per unit of time, the more secure the disk memory becomes with respect to airborne particulate matter that may be generated within the file or migrate into the file through imperfect sealing or filtering. The reduced volume or gas enclosed about the elements of the magnetic disk memory also renders less difficult the problems associated with totally sealing the device or the filtering of air introduced as a result of ambient temperature and/or pressure variation.

It will be observed that the duct is initially of reduced continuous section with enlargement of the duct width occurring rapidly prior to the location of the filter element. Avoiding an enlarged duct cross sectional area for any significant distance prior to the filter location avoids the establishment of turbulent conditions that would cause a material pressure loss and reduce the effectiveness of the relatively small pressures that induce flow through the duct.

A second embodiment is illustrated in FIGS. 9 through 12. The bottom view of FIG. 9 and the section of FIG. 10 show the cover plate 73 and the integral wall portions 74, 75, 76, 77, and 78 which cooperate to form an inlet chamber 80. The inlet opening 81 formed in cover plate 73 communicates with the inlet chamber 80. A series of holes 82 through wall 75 cause that wall to be a foraminous wall portion, which has a layer of filter material 84 adhered to the interior surface.

Figure 12:
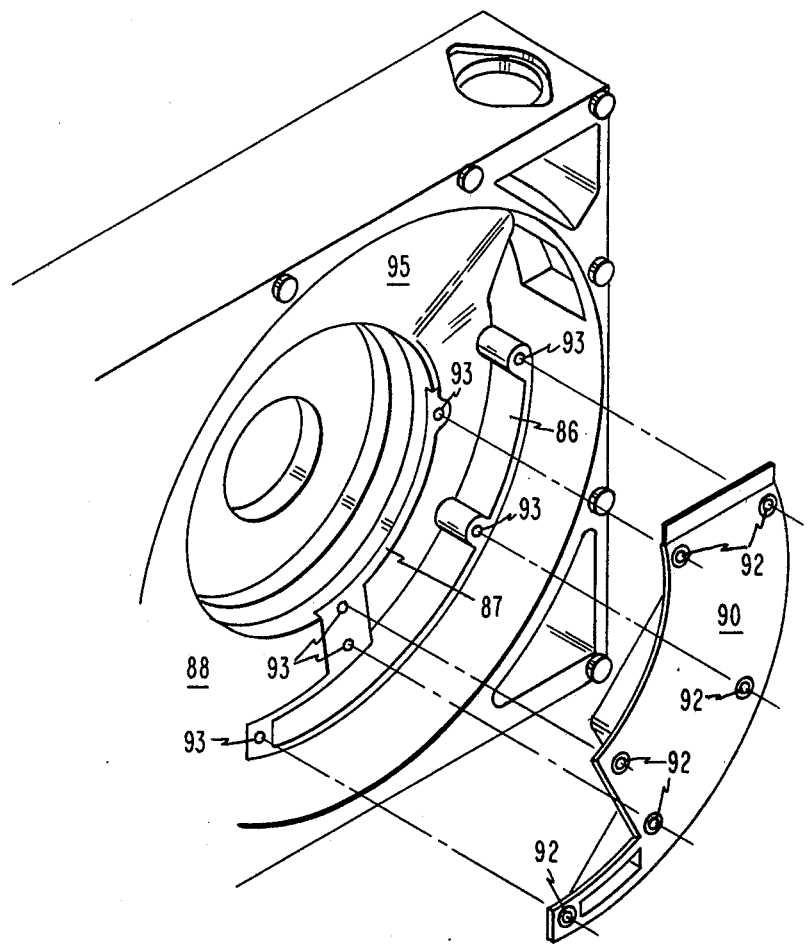
FIG. 12 is an exploded view of a portion of the base member, using the structure of the second embodiment, with the cover plate-inlet chamber-filter assembly of that embodiment.

FIG. 12 is a partial view similar to the base member 10 of FIG. 1, but designated 10' and showing a modified recess 86 which is formed to receive cover plate 73 in the environment of the second embodiment of the invention. Base 10' has a recessed surface 87 which is offset from the shroud surface 88 such that the surface 90 of cover plate 73 is coplanar with shroud surface 88 in the assembled condition. In the assembled condition, cover plate 73 is secured to base 10' by six tapered head screws (not shown) that are received through cover plate openings 92 and received in threaded base openings 93. The upper portions of cover plate openings 92 are frusto conical to permit the tapered head screws to present an upper surface approximately coplanar with cover plate surface 90 in the assembled condition.

Figure 11:
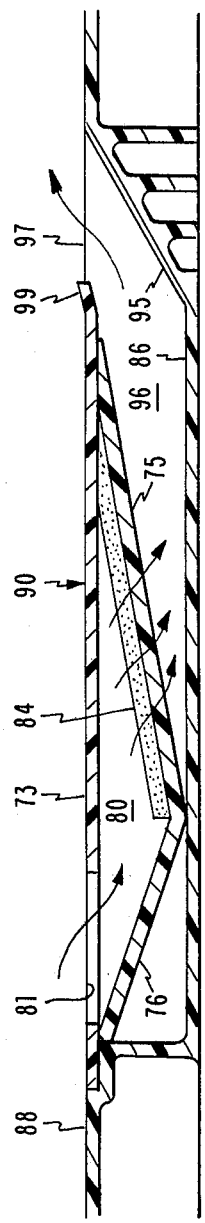
FIG. 11 is a section view similar to FIG. 10, but shown in the assembled condition as seen viewing radially outward.

As seen in the assembled condition of FIG. 11, which is a section similar to FIG. 10, but in the assembled condition and viewed radially inward, the base cover assembly, the cavity 86 and the inclined surface 95 form an outlet chamber 96 communicating with the outlet opening 97. In the presence of a moving disk (as shown in FIG. 7), air is induced to flow through the filter duct as indicated by the arrows. Air passes through inlet opening 81 into inlet chamber 80, then through filter 84, foraminous wall 75, outlet chamber 96 and finally through outlet opening 97. The cover plate 73 terminates at the outlet opening end in an upper surface 99 which inclines upwardly from base plate surface 90.

While the invention has been particularly shown and described with reference to a particular embodiment thereof, it will be understood by those skilled in the art that the foregoing and other changes in form and details may be made therein without departing from the spirit and scope of the invention.

Having thus described our invention, what we claim as new and desired by letters patent is:

1. A magnetic disk memory comprising:
   disk means supported for rotation about a central axis;
   motive means operatively connected to said disk means to cause rotary motion about said central axis;
   cover means enclosing said disk means and including shroud means adjacent at least one surface of said disk means;
   a duct formed in said shroud means having an inlet adjacent the periphery of said disk means and an outlet underlying said disk means and radially inward of said inlet;
   a filter means in said duct intermediate said inlet and outlet; and
   a deflector adjacent said outlet opening adjacent the side thereof first approached by a point on said rotating disk means and presenting a surface inclined toward said disk means whereby the clearance between the deflector and disk means is progressively reduced in the direction of disk means rotation.

2. The magnetic disk memory of claim 1 wherein said cover means includes shroud means adjacent both surfaces of said disk means and further comprising a projection on said shroud means approaching the disk means surface opposite that confronted by said deflector and presenting a crest axially spaced and substantially aligned with the surface of said deflector most closely approaching said disk means.

3. The magnetic disk memory of claim 2 wherein said disk means includes a plurality of axially aligned disks and the axial spacing between adjoining disks of said plurality exceeds the axial spacing between said disk means and the major portion of the shroud means surface confronting said disk means at each axial end of said disk means.

4. The magnetic disk memory of claim 3 wherein the radial width of said duct in the angular direction from said inlet to said filter means initially gradually increases and thereafter rapidly increases.

5. A magnetic disk memory comprising:
   a disk means supported for rotation about a central axis;
   motive means operatively connected to said disk means to cause rotary motion about said central axis;
   cover means enclosing said disk means and including shroud means adjacent at least one surface of said disk means;
   a duct within said cover means having an inlet through said shroud means confronting the surface of said disk means and an outlet angularly spaced from said inlet in the direction of disk rotation and opening through said shroud means to confront said disk means surface;
   a filter disposed in said duct intermediate said inlet opening and said outlet opening; and
   deflector means presenting an inclined surface extending from said shroud means toward said disk means surface in the direction of disk rotation, adjacent the angular side of said outlet opening intermediate said inlet opening and said outlet opening.

6. The magnetic disk memory of claim 5 wherein the area center of the duct inlet opening is a greater radial distance from the axis of disk rotation than the area center of the duct outlet opening.

7. The magnetic disk memory of claim 6 wherein said shroud means adjoins each axial end of said disk means; said disk means includes a plurality of axially aligned disks and the axial spacing at each axial end of said disk means between the major portion of the confronting shroud wall surface and the disk means surface is less than the axial spacing between adjoining disks of said plurality.

8. The magnetic disk memory of claim 7 wherein the shroud means adjoining the axial surface of said disk means opposite the axial end confronted by said duct inlet and outlet openings has a substantially radially oriented projection extending toward the disk means and axially aligned with said deflector means.

9. The magnetic disk memory of claim 8 wherein the radial width of said duct angularly extending from said inlet opening to the location of said filter initially gradually increases and thereafter rapidly increases.

10. A magnetic disk memory comprising:
   a disk means supported for rotation about a central axis;
   motive means operatively connected to said disk means to cause rotary motion about said central axis;
   cover means enclosing said disk means and including shroud means adjacent at least one surface of said disk means;
   a recess formed in said shroud means confronting said one surface of said disk means and extending angularly with respect to said central axis;
   a cover plate secured to said shroud means and cooperating with said recess to form a duct with angularly spaced inlet and outlet openings which confront said surface of said disk means;
   wall means formed as a part of said cover plate defining an inlet chamber communicating with said inlet opening;
   an outlet chamber formed by said recess and said cover plate which communicates with said outlet opening; and
   a foraminous wall portion, included in said wall means, with filter material overlying the open area, said wall portion separating said inlet chamber from said outlet chamber, whereby an induced air flow through said duct enters through said inlet opening, passes through said inlet chamber, said foraminous wall portion and said outlet chamber and leaves through said outlet opening.

11. The magnetic disk memory of claim 10 wherein said foraminous wall portion comprises an extended surface such that the open area over which said filter material extends is at least three times the area of said inlet opening.

12. The magnetic disk memory of claim 11 wherein the area center of said inlet opening is a greater radial distance from said central axis than the area center of said outlet opening.

* * * * *